United States Patent [19]

Massengill

[11] Patent Number: 5,122,983
[45] Date of Patent: Jun. 16, 1992

[54] CHARGED-BASED MULTIPLIER CIRCUIT

[75] Inventor: Lloyd W. Massengill, Brentwood, Tenn.

[73] Assignee: Vanderbilt University, Nashville, Tenn.

[21] Appl. No.: 464,103

[22] Filed: Jan. 12, 1990

[51] Int. Cl.$^5$ .................. H03K 19/08; G06G 7/16
[52] U.S. Cl. .................. 364/844; 307/201; 307/498
[58] Field of Search .......... 364/841, 844, 606; 307/201, 498

[56] References Cited

U.S. PATENT DOCUMENTS

| | | | |
|---|---|---|---|
| 3,436,535 | 5/1966 | Sundquist | 364/844 |
| 3,634,671 | 1/1972 | Swarbrick | 364/844 |
| 4,041,299 | 8/1977 | Miyakawa | 364/844 |
| 4,100,432 | 1/1978 | Miyikawa et al. | 307/498 |
| 4,110,835 | 8/1978 | Dubil et al. | 364/844 |
| 4,156,924 | 5/1979 | Lampe et al. | 364/844 |
| 4,366,550 | 12/1982 | Lampe | 364/844 |
| 4,458,324 | 7/1984 | Burke et al. | 364/844 |
| 4,464,726 | 9/1984 | Chiang | 364/844 |
| 4,591,980 | 5/1986 | Huberman et al. | 364/200 |
| 4,774,677 | 9/1988 | Buckley | 364/513 |
| 4,950,917 | 8/1990 | Holler et al. | 307/498 |
| 4,999,521 | 3/1991 | Rusznyak | 307/498 |

OTHER PUBLICATIONS

El-Leithy A Basic Mos Neural-Type Junction Proc. of the First IEEE Int'l Conf. on Neural Networks, San Diego, 1987, vol. III, pp. 469-477 (1987).

Primary Examiner—Jerry Smith
Assistant Examiner—Jim Trammell
Attorney, Agent, or Firm—Arnold B. Silverman; Rita M. Rooney

[57] ABSTRACT

A charge-based multiplier circuit is provided which generates a charge packet proportional to the product of an input signal and a weight voltage. An exponential pulse is formed which is representative of the input signal. The circuit generates an output charge proportional to the product of the peak magntiude of the exponential pulse and the exponential decay time constant, which is represented by the weight voltage. The output charge can be generated as a charge onto an output bus for positive results, or the amount can be depleted from the bus for negative results.

15 Claims, 3 Drawing Sheets

CHARGED-BASED MULTIPLIER CIRCUIT

BACKGROUND OF THE INVENTION

1. Field of the Invention

The present invention relates to a charge-based analog multiplier circuit which generates an output representative of the product of an input signal and a weight voltage. The output product can either be generated as a charge onto an output bus or the amount can be depleted from an output bus to represent a negative result. The circuit of the present invention is particularly useful as a neural cell within a neural network system.

2. Description of the Prior Art

A circuit which produces an output related to the product of an input signal and a weight is a necessary element in many applications. Such circuits are particularly important for massively parallel data processing and cognition performed in artificial neural networks. Many neural networks use massively parallel, digital processing arrays which emulate individual neuron behavior by digital computations in local processing elements (PEs).

In addition to digital techniques, various analog VLSI implementation of neural networks have been known or suggested. Several attributes of these systems include: simplicity of the neural processing elements, natural extensions from actual biological processes to electrical analogies, efficient signal representations and continuous signals.

Various processing elements have been known. For example, U.S. Pat. No. 4,809,193 discloses a matrix of processing elements based on radiant communications among waveguides. Several digital techniques have also been known. See, for example, U.S. Pat. No. 4,591,980 which discloses a matrix of locally-connected digital processing elements.

U.S. Pat. No. 4,796,199 discloses a method of connecting digital processing elements to achieve neural-like computations. These digital techniques are based on current microprocessor techniques and utilize discrete, binary computational elements instead of analog, or continuous signals.

Methods and devices for pattern recognition have also been known. See, for example, U.S. Pat. No. 4,805,225 which discloses a general purpose pattern recognition method and apparatus comprises a hierarchical network of basic recognizers.

Various connectionist systems have also been known. See U.S. Pat. No. 4,858,177 which discloses a minimal connectivity parallel data processing system. U.S. Pat. No. No. 4,813,076 discloses a speech processing apparatus and method. Optical techniques have been disclosed. See, for example, U.S. Pat. No. 4,803,736 which discloses a neural network for machine vision. U.S. Pat. No. 4,849,940 discloses an optical neural net memory, and U.S. Pat. No. 4,862,406 discloses an adaptive associative-processing optical computing architecture.

Self-organizing circuits have been known. See, for example, U.S. Pat. No. 4,774,677 which discloses a circuit using both analog and digital circuitry and which present competition among inputs.

Some charge-based devices have also been known. For example, a charge-based approach is disclosed in El-Leithy et al., *A Basic MOS Neural-Type Junction: A Perspective on Neural-Type Microsystems*, Proceedings of the First IEEE International Conference on Neural Networks, San Diego, 1987, Vol. III, pp. 469–477 (1987). The circuit disclosed therein is based on the sensing of incoming impulse signals and an output stage to generate output impulses. The nature of operation of the circuit involves temporal and spatial summation of input impulses. However, a large number of interconnections are necessary with this design which can be very limiting.

There remains a need for a multiplier circuit which produces an output capable of sourcing or sinking an amount proportional to the product of an analog input signal and an analog weight. There remains a further need for such a charge-based analog circuit amenable to use in single-chip, multi-layer neural networks In addition, there remains a need for a circuit the output of which may be multiplexed onto a shared communication bus which connects groups of such circuits.

SUMMARY OF THE INVENTION

These and other needs are satisfied by the present invention which provides a circuit which produces an output with an integral charge proportional to the product of an input signal and an interconnection weight voltage, hereinafter referred to as a "weight". The circuit of the present invention is a pulsed, two-quadrant analog multiplier circuit which is amenable to integration in multi-layer MOS neural network structures. The pulsed multiplier circuit receives an input pulse signal $V_s$. This pulse is transmitted through the capacitive coupling of, preferably, two capacitors to the drains of each of, preferably, two MOSFET devices. This stage of the circuit is used to determine the height of the exponential input pulse. The voltage, VW, stored on the gates of the two MOS devices, determines the fall time of the exponential. The charge delivered by a one-sided exponential current pulse is equal to the current magnitude at the peak of the pulse multiplied by the fall time constant. The charge delivered by the two devices is proportional to the product of the peak magnitude and the exponential time constant due to the circuit design, as discussed more fully hereinafter. At an output stage, preferably two MOS devices act to source or sink current pulses to a pre-charged bus which integrates the currents. The voltage shift of this bus is approximately proportional to the product of the input signal and the weight signal. If desired, the analog circuits of the present invention can be time-division multiplexed in order to use the bus for interconnection and shared processing circuits between multiple layers of such circuits.

It is an object of the present invention to provide a circuit which is capable of accomplishing true continuous, as opposed to binary, weighting of signals.

It is an object of the present invention to provide pulsed operation allowing for analog multiplexing of interconnects.

It is another object of the invention to provide a device which requires no operational amplifiers for the multiplication function and requires no power in the static mode.

It is another object of the invention to provide a device which can be implemented in standard analog CMOS processing.

It is a further object of the invention to provide a multiplier circuit which is simple in design and modular in structure so that it may be used in single-chip analog structure and particularly in neural network architectures.

These and other objects of the invention will be more fully understood from the following description of the invention, with reference to the illustrations appended hereto.

DESCRIPTION OF THE PREFERRED EMBODIMENTS

Figure 1:
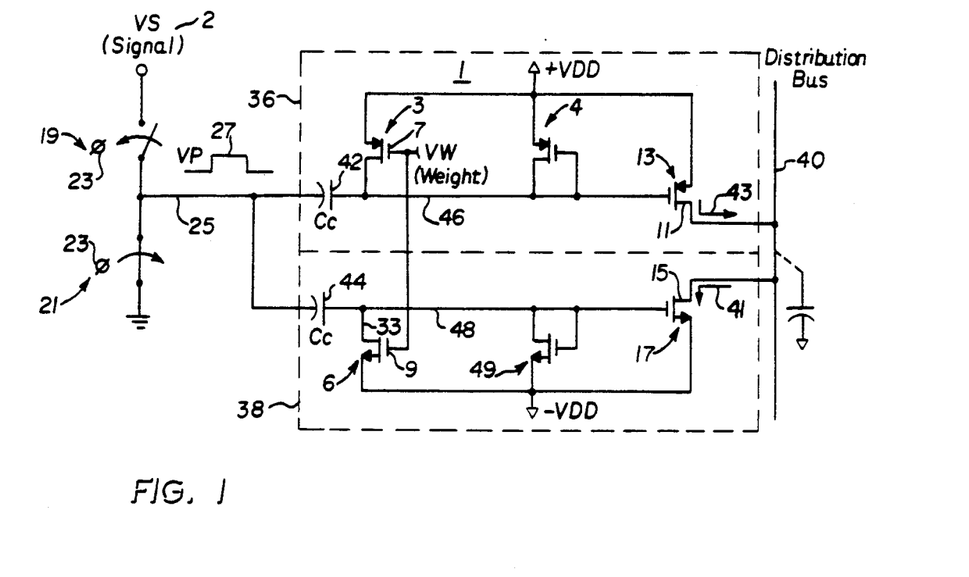
FIG. 1 is a circuit diagram of one embodiment of the circuit of the present invention.

Referring to FIG. 1 there is shown a multiplier circuit constructed in accordance with the present invention. An input signal VS is applied to the circuit 1 as shown by reference character 2. A weight voltage VW is applied to the circuit at the gates of MOSFET devices 3 and 6. This weight voltage may be supplied from an external source, or may be stored in a non-volatile fashion in MOSFET devices 3 and 6 as a gate voltage at 7 and 9, respectively, if devices 3 and 6 are floating-gate type MOS devices. This type of nonvolatile storage is common and known to those skilled in the art. When this circuit is pulsed (or clocked) by a signal denoted φ in FIG. 1, it generates an output current pulse at drain 11 of MOSFET device 13 and an input current pulse at the drain 15 of MOSFET device 17. The net charge supplied by drain 11 minus the net charge depleted by drain 15 is approximately proportional to the arithmetic multiplication of the input signal VS and the weight voltage VW. In this way, both positive and negative weights can be represented by gate voltages at 7 and 9 over the range of −VDD to VDD volts, as shown in FIG. 1.

Switches 19 and 21 form a rectangular pulse generator. When the clock 23 is active, switch 19 closes and switch 21 opens. When clock 23 is inactive, switch 19 opens and switch 21 closes. Thus, the voltage waveform at node 25, VP, is of rectangular pulse shape, as shown by reference character 27, with a value of zero volts when clock 23 is inactive and VS volts when clock 23 is active. Switches 19 and 21 may be constructed with MOSFET devices, both p-channel and n-channel, in pass transistor configurations, which is a common practice in digital and analog MOS circuit design, and would be understood by those skilled in the art.

Figure 2:
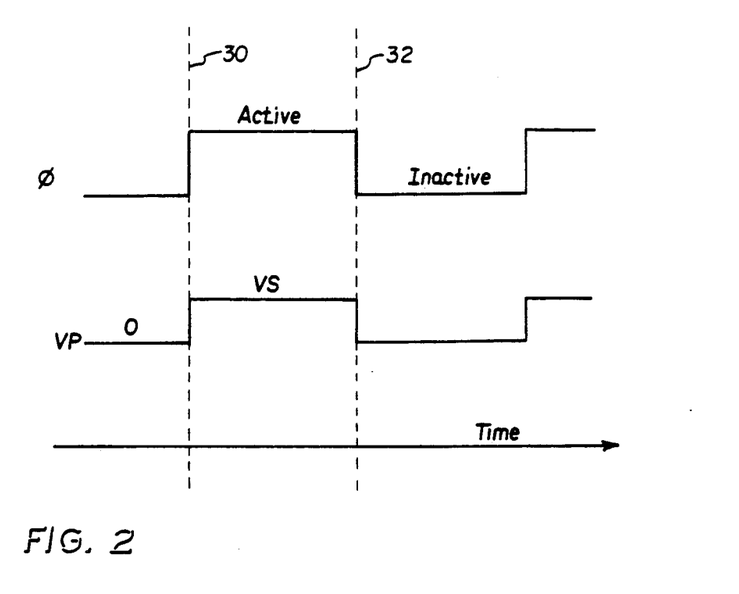
FIG. 2 shows a clocking sequence of the circuit of FIG. 1.

An exemplary clocking scheme, as well as the corresponding voltage waveform at node 25, is shown in FIG. 2. In FIG. 2, the horizontal x-axis corresponds to time, and the vertical y-axis corresponds to voltage levels. At the point in time denoted by reference character 30, the voltage VP at node 25 rises from a value of 0 volts to a value of VS volts. At time point 32 the voltage at node 25 drops from VS volts to a value of 0 volts. This is considered one complete clocking cycle of the multiplier circuit.

Referring again to FIG. 1, the circuitry enclosed by dashed box 36 is considered the positive side of the multiplier circuit. Likewise, the circuitry enclosed by box 38 is considered the negative side of the multiplier circuit. These two sides of the circuit operate in analogous fashions, but the positive side 36 generates a sourcing current onto bus 40 and the negative side 38 generates a sinking current off of bus 40. Thus both positive and negative shifts in the voltage on bus 40 can be produced with positive and negative weight voltages VW, as is discussed hereinbefore.

The voltage changes appearing at node 25 at time points 30 and 32 are transferred through capacitors 42 and 44 by capacitive coupling to nodes 46 and 48. Thus, changes in voltage at nodes 46 and 48 are induced by the voltage pulse at node 25. If capacitors 42 and 44 have values much larger than the parasitic capacitances associated with nodes 46 and 48, and the waveform at node 25 has very sharp transitions, then the induced voltage transitions at nodes 46 and 48 will approximate the voltage transitions appearing at node 25.

Referring now to the negative side 38 of the multiplier circuit 1, node 48 has an initial voltage value of −VDD, the negative power supply voltage. The positive shift in the voltage appearing at node 25 at time point 30 (FIG. 2) induces a like positive shift in the voltage at node 48. This voltage then decays toward −VDD because of current drain from n-channel MOSFET devices 6 and 49. Device 6, mentioned hereinbefore, and device 49 are n-channel MOSFET devices matched in size. Relying on basic circuit and device theory, the current through the drain of device 6 is given by:

$$I_6 = K_N[(V_{GS} - V_T)V_{DS} - \tfrac{1}{2}V_{DS}^2] \qquad (1)$$

where $K_N$ is a physical and geometric constant of n-channel device 6, $V_{GS}$ is the voltage at the gate 9 of the device 6 referenced to −VDD, $V_T$ is the threshold voltage of the device 6 (another physical constant), and $V_{DS}$ is the voltage at the drain 10 of the device 6 (node 48) referenced to −VDD. The current through the drain of device 49 is given by:

$$I_{49} = \frac{K_N}{2}(V_{DS} - V_T)^2 \qquad \text{Eq. (2)}$$

Where the symbols are equivalent to those hereinbefore defined. The sum of these two currents off of node 48 is given by:

$$I_{TN} = K_N[(V_{GS} - 2V_T)V_{DS} + \tfrac{1}{2}V_T^2] \qquad (3)$$

which is equivalent to a voltage across a resistance and a constant current source, as given by:

$$I_{TN} = \frac{V_{DS}}{RN} + \frac{K_N}{2}V_T^2 \qquad \text{Eq. (4)}$$

where the resistance RN is given by:

$$RN = \frac{1}{K_N(V_{GS} - 2V_T)} = \frac{1}{K_N(VX + VDD - 2V_T)} \qquad \text{Eq. (5)}$$

This resistance value is controlled by the weight voltage (VW) stored on gate 9 of device 6.

Thus, the matched pair of devices, 6 and 49, produce an equivalent resistance for the decay of the induced voltage at node 48 based on the weight voltage supplied to the circuit. Basic circuit theory states that the decay of a capacitive voltage through an equivalent resistance is an exponential decay with a decay time-constant of value (R)(C), where R is the equivalent resistance of the decay current path and C is the total capacitance of the node. So, the voltage waveform at node 48 is approximately exponential in nature, with the decay controlled by the equivalent RN of Equation 5.

Figure 3A:
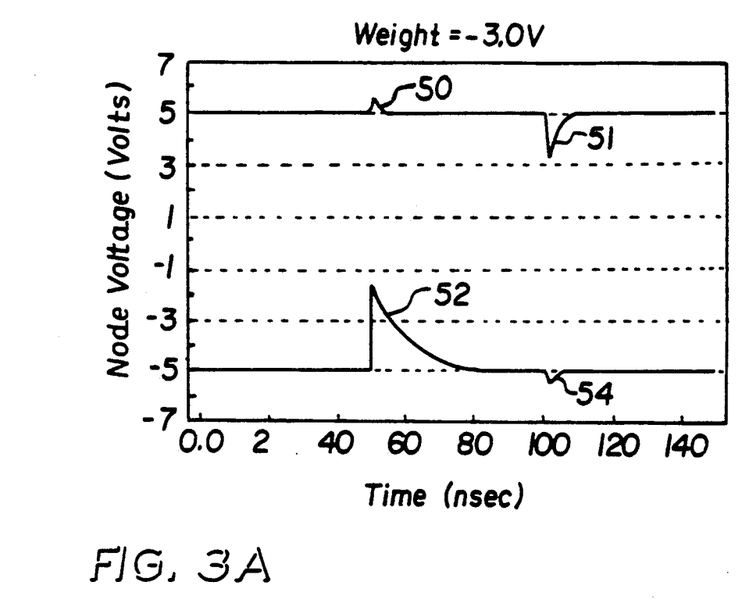
FIG. 3A shows waveforms of pulses at particular nodes of the circuit of FIG. 1 for a weighting voltage of −3 V.
Figure 3B:
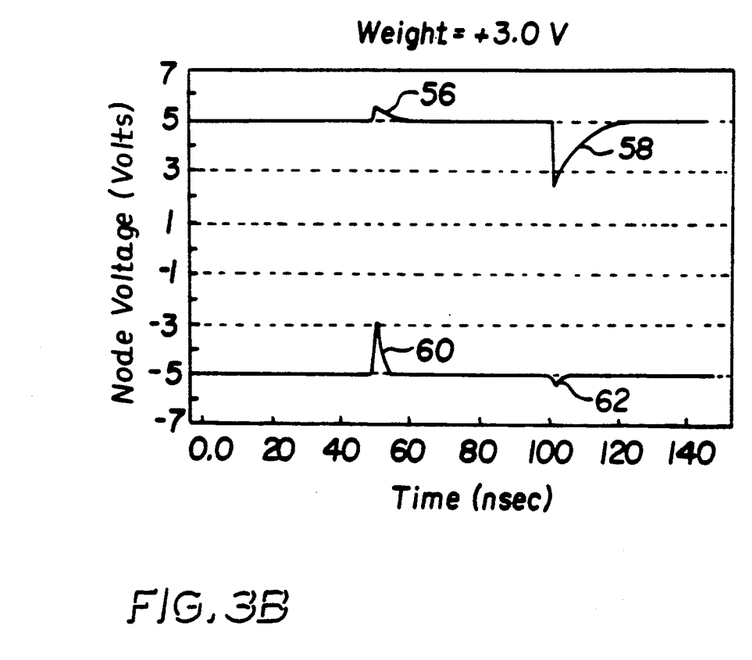
FIG. 3B shows waveforms of pulses at particular nodes of the circuit of FIG. 1 for a weighting voltage of +3 V.

Tests were performed employing a software package entitled SPICE2G5 from the University of California at Berkeley. The results are shown in FIGS. 3A and 3B. These figures show plots of voltage in volts against time in nanoseconds. Pulses 52 and 54 show the voltage waveforms at node 48 during one complete clocking cycle with an applied weight voltage of −3 volts and an applied input signal voltage of 5 V. Pulses 50 and 51 are the voltage waveforms at node 46 for applied weight voltage of −3 volts, as discussed hereinafter. Pulses 60 and 62 of FIG. 3B show similar voltage waveforms at node 48 for a weight voltage or +3 volts and an input signal of 5 volts. Pulses 56 and 58 show the waveform at node 46 for the same voltage as discussed hereinafter. Pulses 52 and 60 show the exponential behavior of the voltage at node 48. It will be noted that the positive voltage shift at node 48 is the dominant pulse.

N-channel MOSFET device 17 (FIG. 1) serves as an output device. The drain current supplied by this device is determined by the gate voltage at node 48, which is the decaying exponential. The current through device 17 will in turn be an exponential pulse in nature as long as device 17 operates in the saturation region. This can be insured by constraints on the voltages of bus 40. The current of device 17 will be a current pulse as shown by reference number 41, which depletes charge from the bus 40.

The charge delivered by a current pulse is equal to the integral of the current over time. Basic calculus theory states that the charge delivered by a one-sided exponential current pulse (i.e. the integral of an exponential) is given by the peak current value multiplied by the decay time constant. Thus, the charge Q delivered by current 41 is controlled by the peak value of the waveform at node 48 as well as the decay constant of this waveform. That is, $$Q \approx (A)(I_{max})(RN)(C) + \text{constant} \qquad (6)$$

where A is a constant, $I_{max}$ is the peak value of the output current, RN is the equivalent resistance of Equation 5, and C is the value of capacitance 44. This is how the circuit derives the multiplication function of two variables. As hereinbefore discussed, the peak value of the waveform at node 48 is dependent on the input signal value pulsed onto node 25, and the decay time of the voltage waveform at node 48 is determined by the matched pair of devices 6 and 49 pursuant to the weight voltage applied at 9; thus, the charge delivered by current 41 is related to the product of the input signal and the weight voltage, as desired.

Referring to FIG. 1, the circuitry enclosed by box 36 is considered the positive side of the multiplier circuit. This circuitry operates in analogous fashion to the negative side 38 hereinbefore discussed, except that voltages are referenced to VDD and the circuitry generates a current pulse onto bus 40.

The voltage changes at time points 30 and 32 (FIG. 2) are transferred through capacitor 42 by capacitive coupling to node 46. Thus a change in voltage at this node is induced by the voltage pulse at node 25.

Node 46 has an initial voltage value of +VDD, the positive power supply value. The negative shift in the voltage at node 25 induces a like negative shift in the voltage at node 46. This voltage then decays toward +VDD because of current through p-channel MOSFET devices 3 and 4. Devices 3 and 4 are p-channel MOSFET devices matched in size. Relying on basic circuit and device theory, the current through the drain of device 3 is given by:

$$I_3 = K_p[(V_{SG} + V_T)V_{SD} - \tfrac{1}{2}V_{SD}^2] \qquad (7)$$

where KP is a physical and geometric constant of p-channel MOSFET device 3, $V_{SG}$ is the voltage at the gate 7 of the device 3 referenced from +VDD, $V_T$ is the threshold voltage of the device 3 (another physical constant), and $V_{SD}$ is the voltage at the drain of device 3 (node 48) referenced from +VDD. The current through the drain of device 4 is given by:

$$I_4 = \frac{KP}{2}(V_{SD} + V_T)^2 \qquad \text{Eq. (8)}$$

Where the symbols are equivalent to those just defined. The sum of these two currents onto node 46 is given by:

$$I_{TP} = KP[(V_{SG} + 2V_T)V_{SD} + \tfrac{1}{2}V_T^2] \qquad (9)$$

which is equivalent to a voltage across a resistance and a constant current source, as given by:

$$I_{TP} = \frac{V_{SD}}{RP} + \frac{KP}{2}V_T^2 \qquad \text{Eq. (10)}$$

where the resistance RP is given by:

$$RP = \frac{1}{K_p(V_{SG} + 2V_T)} = \frac{1}{K_p(VDD - VW + 2V_T)} \qquad \text{Eq. (11)}$$

This resistance value is controlled by the weight voltage stored on gate 7 of device 3.

Thus, the matched pair of devices 3 and 4 produce an equivalent resistance for the decay of the induced voltage at node 46 based on the weight voltage supplied to the circuit. So the voltage waveform at node 46 is approximately exponential in nature.

Tests were performed on the operation of this part of the circuit using SPICE2G5. The results are shown in FIGS. 3A and 3B, as mentioned hereinbefore. Pulses 50 and 51 show the voltage waveforms at node 46 during one complete clocking cycle with an applied weight voltage of −3 volts and an applied input signal voltage of 5 V. References 56 and 58 show similar waveforms at node 46 with an applied weight voltage of +3 volts and input signal of 5 V. 51 and 58 show the exponential behavior of the voltage at node 46. The negative voltage shift at node 46 is the dominant pulse.

P-channel MOSFET device 13 (FIG. 1) serves as an output device. The drain current supplied by this device is determined by the gate voltage at node 46, which is the decaying exponential. The current through device 13 will in turn be exponential pulse in nature. However, this pulse will be a current pulse as shown by reference number 43, sourced onto the bus 40.

As discussed hereinbefore, the charge delivered by a one-sided exponential current pulse is given by the peak current value multiplied by the fall time constant. Thus, the charge delivered by current 43 is controlled by the peak value of the waveform at node 46 as well as the decay constant of this waveform. As hereinbefore discussed, the peak value of the waveform at node 46 is dependent on the input signal value pulsed onto node 25; and the decay time of the voltage waveform at node 46 is determined by the matched pair of devices 3 and 4 pursuant to the weight voltage applied at 7. Thus, the current 43 is related to the product of the input signal and the weight voltage, as desired.

Figure 4A:
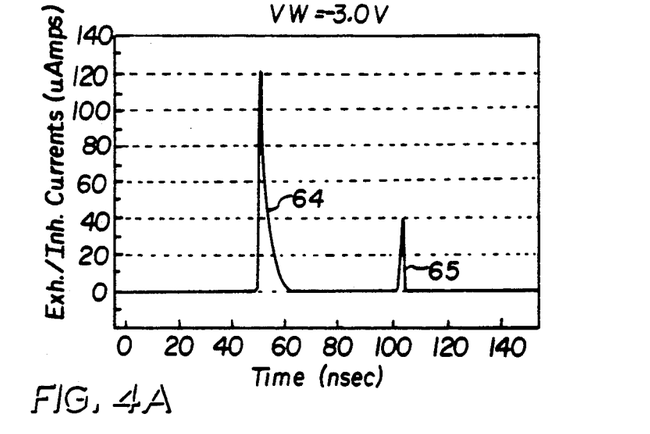
FIG. 4A shows waveforms of the output current pulses of the circuit of FIG. 1 for a weighting voltage of −3 V.
Figure 4B:
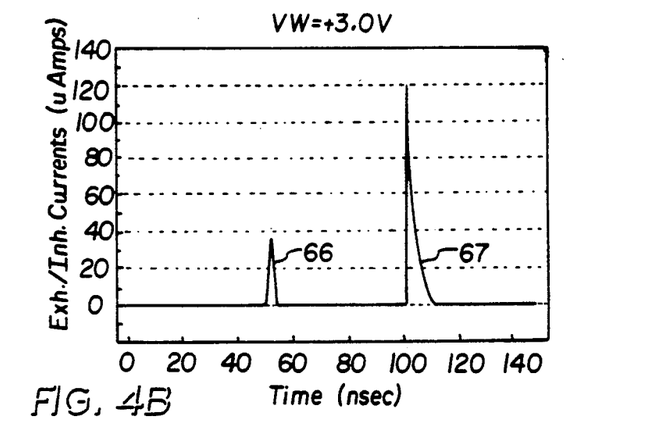
FIG. 4B shows waveforms of the output current pulses of the circuit of FIG. 1 for a weighting voltage of +3 V.

FIGS. 4A and 4B show SPICE circuit simulation results of the currents 43 and 41 for weight values of −3 and +3 volts, respectively. Both of these simulations were performed with an input signal of 5 volts. In FIG. 4A, current pulse 64 shows the waveform of current 41 (FIG. 1). Pulse 65 shows the waveform of current 43 (FIG. 1). As can be seen, for a negative weight of −3 volts, the depletion current is much larger than the sourcing current, thus causing a net negative charge flow off of the bus 40, and thus a negative voltage shift. In FIG. 4B, current pulse 66 shows the waveform of current 41 and pulse 67 shows the waveform of current 43. Here, for a positive weight of +3 volts, the sourcing current 43 (pulse 67) is much larger than the depletion current 41 (pulse 66). This causes a net positive charge flow onto bus 40, and thus a positive voltage shift along this bus. Also, the exponential nature of these current pulses can be seen in the figures.

The capacitance of bus 40 acts to integrate the charge pulses delivered by devices 13 and 17, as well as short term storage of the charge packets delivered.

It can be seen from the above explanations that a weight voltage greater than zero volts will cause current 43 to be larger than current 41, thus causing a positive voltage shift along bus 40 due to the integrating capacitance of the bus. Likewise, a weight value less than zero volts will cause a negative shift in the voltage along bus 40 since current 41 will be larger than current 43. The net shift in the voltage on the capacitance of bus 40, either positive or negative, is determined by the input signal and the weight voltage.

N-channel devices 6, 49 and 17 of FIG. 1 are sized relative to p-channel devices 3, 4, and 13 so that the current drives will be approximately equivalent with equal terminal voltages applied. This sizing technique is common in the field of integrated circuit design and would be understood by those skilled in the art. The sizing accomplishes symmetry of the circuit between sub-circuit 36 and sub-circuit 38 about zero. Thus, if the MOSFETs are properly sized, an applied weight voltage, VW, of zero volts will induce exactly the same amount of current 43 onto the distribution bus 40 as the amount of current 41 off of the distribution bus 40. Thus, the charge packets delivered by 43 and 41 exactly compensate each other. In this way, a weight of zero volts causes a net charge buildup on the bus 40 of zero, as desired. In some applications, it may be desirable to have two separate busses. One "excitatory" bus would receive positive output voltages and a second "inhibitory" bus would be used for negative outputs.

Figure 5:
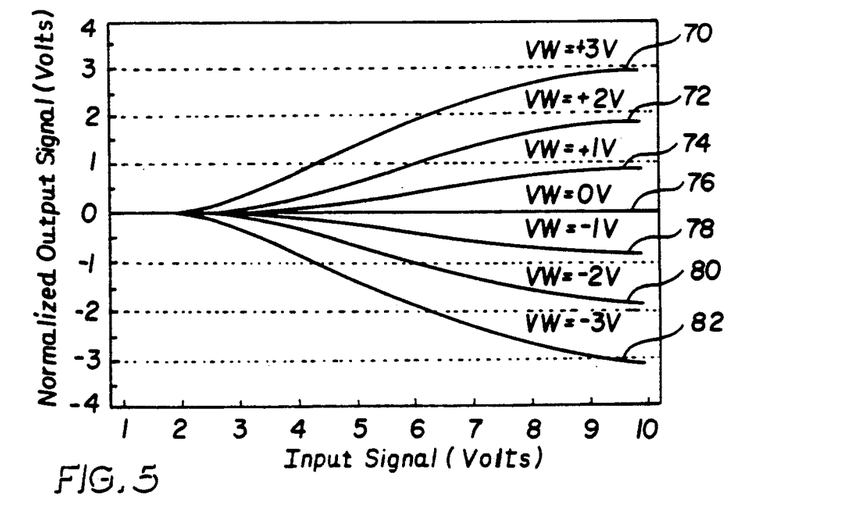
FIG. 5 shows waveforms depicting the two-quadrant multiply operation of the circuit of FIG. 1.

Tests were formed as to the operation of the circuit of the present invention using SPICE2G5. The results are shown in FIG. 5. In FIG. 5, the multiply operation of the cell is shown. The horizontal x-axis corresponds to the input signal voltage. The vertical y-axis corresponds to the voltage induced on bus 40 normalized to the voltage induced by a dummy circuit with a constant weight of zero volts. Curve 76 corresponds to the output voltage for a weight value of zero. As can be seen, the output is a constant zero regardless of the input signal level, as is desired. The other curves 70, 72, 74, 78, 80, and 82, show the output voltage as a function of the input signal for various weight values. If the input signal is limited to operate within the range of 2 volts to 8 volts, the output is fairly linear with both input signal and weight value. As is often the case in any multiplier-type circuit, there is a range of voltages over which approximately linear operation is expected, but nonlinearities come into play outside of this range. In this case, the range of inputs from 2 V to 8 V is a relatively large and good range.

The S-shaped (or Sigmoid) behavior of the curves of FIG. 5 are not detrimental to the operation of the circuit depending upon the application; for example, they would not be detrimental where the circuit is used in a neural network type system. In many cases, a Sigmoid output is desirable and required as part of the system function. Thus, this type of output shape is an advantage in many applications including, for example, when the circuit is implemented in these neural systems Many of these circuits may be connected to a single bus and activated concurrently. Also, since this is a pulsed circuit, one such circuit may be activated independently of other such circuits which are connected to the same bus. Thus, many such circuits may be multiplexed onto a single bus. This is particularly useful in neural network systems. My co-pending U S. Patent Application Ser. No. 07/469,112, entitled NEURAL NETWORK SYSTEM, filed Jan. 12, 1990, discloses a neural network system with which the circuits of the present invention may be used as primitive cells. The outputs of the circuits can be multiplexed onto a single capacitive bus. The disclosure of that application is expressly incorporated herein. It should be appreciated, therefore, that the circuit of the present invention is a charge-based multiplier circuit which has many applications in the fields of neural network systems as described in my copending application which is referenced above, as well in the signal processing area wherein the circuit is useful, inter alia, as a multiplier and an amplifier.

It should be further appreciated that the invention provides a circuit wherein the output current is such that many of these circuits may deposit charge on an accumulation bus simultaneously This eliminates the need for massive interconnect requirements presented in some prior art neural network techniques.

The integrated design of the circuit of the present invention is simple in structure, it requires no operational amplifiers for the actual multiplication function, requires no power in the static mode, and can be implemented in standard analog CMOS processing.

While for convenience of disclosure, the circuit of the present invention is discussed in the context of a neural network system, it should be understood that the circuit has many applications beyond that of neural networks, such as in signal processing.

Whereas particular embodiments of the invention have been described for purposes of illustration, it will be appreciated by those skilled in the art that numerous variations of the details may be made without departing from the invention as described in the appended claims.

What is claimed is:

1. A multiplier circuit comprising:

input means for storing an input signal, coupling capacitor means operatively associated with said input means for receiving said input signal, said coupling capacitor means having means for generating a transient pulse voltage having a peak magnitude representative of said input signal, weight storage means operatively associated with said coupling capacitor means for storing a predetermined weight voltage representative of a decay time constant for receiving said transient voltage pulse, pulse forming means operatively associated with said weight storage means for producing an exponential voltage pulse having said peak magnitude of said transient voltage pulse and said decay time constant of said weight voltage, output means operatively associated with said pulse forming means for generating a current pulse directly related to said exponential voltage pulse such that a charge quantity delivered by said current pulse is proportional to the product of said peak magnitude of said exponential voltage pulse and said decay time constant of said exponential voltage pulse from said pulse forming means, and said charge quantity delivered by said current pulse represents a multiplication result of said multiplier circuit, and distribution bus means connected to receive said charge quantities from said output means.

2. The multiplier circuit of claim 1 connected to a second said multiplier circuit, wherein said multiplier circuit has first sub-circuit means for processing a weight voltage in a positive range, said first subcircuit means having associated therewith input means, coupling capacitor means, weight storage means, pulse forming means and first output means, said first output means also having means for delivering said charge quantities on to said distribution bus means, and said second multiplier circuit has second sub-circuit means operatively associated with said first sub-circuit means for processing a weight voltage in a negative range, said second sub-circuit means having associated therewith input means, coupling capacitor means, weight storage means, pulse forming means and second output means, said second output means also having means for depleting said charge quantities from said distribution bus means.

3. The multiplier circuit of claim 2 wherein said distribution bus means has excitatory bus means for receiving charge quantities from said first output means of said first sub-circuit means and inhibitory bus means from which charge is depleted by said second output means of said second sub-circuit means.

4. The multiplier circuit of claim 2 wherein said distribution bus means has a single bus for receiving said charge quantities from said first output means of said first sub-circuit means and for supplying said charge quantities to said second output means of said second sub-circuit means.

5. The multiplier circuit of claim 1 wherein said input means has clocking means for strobing said input signal onto said multiplier circuit at predetermined intervals.

6. The multiplier circuit of claim 1 wherein said weight storage means has said weight voltage stored on the gate of a p-channel MOSFET and the drain of said p-channel MOSFET is connected to said coupling capacitor means.

7. The multiplier circuit of claim 6 wherein said pulse forming means includes a p-channel MOSFET having its source connected at a first node to which the source MOSFET of said weight storage means is also of said p-channel connected, and said p-channel MOSFET of said pulse forming means having its drain connected at a second node into which the drain current of said p-channel MOSFET of said weight storage means flows, and said p-channel MOSFET of said pulse forming means having its gate connected at said second node.

8. The multiplier circuit of claim 7 wherein said output means is a p-channel MOSFET, the gate of which is connected at the second node into which the drain current of said p-channel MOSFET of said weight storage means flows, and said p-channel MOSFET of said output means having its drain connected to said distribution bus means and delivers said charge packet onto said distribution bus.

9. The multiplier circuit of claim 1 wherein said weight storage means has said weight voltage stored on the gate of a n-channel MOSFET and the drain of said n-channel MOSFET is connected to said coupling capacitor means.

10. The multiplier circuit of claim 9 wherein said pulse forming means includes a n-channel MOSFET having its source connected at a first node to which the source of said n-channel MOSFET of said weight storage means is also connected, and said n-channel MOSFET of said pulse forming means having its drain connected at a second node into which the drain current of said n-channel MOSFET of said weight storage means flows, and said n-channel MOSFET of said pulse forming means having its gate connected at said second node.

11. The multiplier circuit of claim 10 wherein said output means is a n-channel MOSFET, the gate of which is connected at the second node into which the drain current of said n-channel MOSFET of said weight storage means flows, and said n-channel MOSFET of said output means having its drain connected to said distribution bus means and delivers said charge packet onto said distribution bus.

12. A multiplier circuit comprising:

means for sensing an input signal, positive sub-circuit means connected to receive said input signal, said positive sub-circuit means having first coupling capacitance means for generating a voltage transient representative of the peak magnitude of said input signal, first weight storage means for storing weight representative of a decay constant of said voltage transient, said first weight storage means connected to receive said voltage transient from said first]coupling capacitance means, said positive sub-circuit means also having means for generating an output charge packet proportional to the product of said weight and the peak magnitude of said input signal, and excitatory bus means for receiving said charge packets, negative sub-circuit means connected to receive said input signal, said negative sub-circuit means having second coupling capacitance means for generating a voltage transient representative of the peak magnitude of said input signal, second weight storage means for storing said weight, said second weight storage means connected to receive said voltage transient from said second coupling capacitance means, and said negative subcircuit means also having means for depleting a depletion charge amount from a connected inhibitory bus means said depletion charge amount being proportional to the product of said weight, and the peak magnitude of said input signal, and clocking means for strobing said input signal onto said multiplier circuit.

13. The multiplier circuit of claim 12 wherein
said first weight storage means is a first p-channel MOSFET the drain of which is connected to a first node which first node also receives said voltage transient from said first coupling capacitance means, and said weight is stored on the gate of said first MOSFET, and said second weight storage means is an n-channel MOSFET the drain of which is connected at a second node which second node also receives said voltage transient from said second coupling capacitance means, and said weight is stored on the gate of said second MOSFET.

14. The multiplier circuit of claim 13 wherein
said means for generating an output charge packet is a first output MOSFET connected to receive an output from said first node, and the drain of which delivers said charge packets to said excitatory bus means.

15. The multiplier circuit of claim 14 wherein
said means for depleting said depletion charge amount is a second output MOSFET connected to receive an output from said second node, and the drain of which depletes said depletion charge amount from said inhibitory bus means.

* * * * *

UNITED STATES PATENT AND TRADEMARK OFFICE
CERTIFICATE OF CORRECTION

PATENT NO. : 5,122,983  
DATED : June 16, 1992  
INVENTOR(S) : LLOYD W. MASSENGILL It is certified that error appears in the above-identified patent and that said Letters Patent is hereby corrected as shown below:

Column 2, line 13, --.-- should be inserted after "networks".

Column 4, line 38, --Eq.-- should be inserted before "(1)".

Column 4, line 55, --Eq.-- should be inserted before "(3)".

Column 4, line 67, in the right-most fraction of Eq. (5), "VX" should be --VW-- and the equation should look as follows:

$$RN = \frac{1}{K_N(V_{GS}-2V_T)} = \frac{1}{K_N(VW+VDD-2V_T)}$$

Column 5, line 22, --an-- should be inserted after "for".

Column 5, line 25, "or" should be --of--.

Column 5, line 51, --Eq.-- should be inserted before "(6)".

UNITED STATES PATENT AND TRADEMARK OFFICE
CERTIFICATE OF CORRECTION

PATENT NO. : 5,122,983

DATED : June 16, 1992

INVENTOR(S) : LLOYD W. MASSENGILL

It is certified that error appears in the above-identified patent and that said Letters Patent is hereby corrected as shown below:

Column 6, line 1, --+-- should be inserted after "to".

Column 6, line 17, --Eq.-- should be inserted before "(7)".

Column 6, line 23, --5-- should be inserted after "drain".

Column 6, line 33, --Eq.-- should be inserted before "(9)".

Column 6, line 52, --,-- should be inserted after "So".

Column 7, line 24, "volts." should be --volts,--.

Column 8, line 28, --.-- should be inserted after "systems".

Column 8, line 36, "07/469,112" should be --07/464,112--.

Column 8, line 53, --.-- should be inserted after "simultaneously".

UNITED STATES PATENT AND TRADEMARK OFFICE
CERTIFICATE OF CORRECTION

PATENT NO. : 5,122,983
DATED : June 16, 1992
INVENTOR(S) : LLOYD W. MASSENGILL It is certified that error appears in the above-identified patent and that said Letters Patent is hereby corrected as shown below:

Claim 1, column 9, line 9, "pulse voltage" should be --voltage pulse--.

Claim 7, column 10, line 12, --of said p-channel-- should be inserted after "source".

Claim 7, column 10, line 13, "of said" should be deleted.

Claim 7, column 10, line 14, "p-channel" should be deleted.

Claim 12, column 10, line 66, "]" should be deleted.

Signed and Sealed this

Sixteenth Day of August, 1994

Attest:

BRUCE LEHMAN

*Attesting Officer*    *Commissioner of Patents and Trademarks*